(12) United States Patent
Fel et al.

(10) Patent No.: US 10,822,002 B1
(45) Date of Patent: Nov. 3, 2020

(54) EXTERNAL AIRBAG ASSEMBLY FOR A RAIL VEHICLE

(71) Applicant: Bombardier Transportation GmbH, Berlin (DE)

(72) Inventors: Landri Fel, Vienna (AT); Markus Baumgartner, Buchkirchen (AT)

(73) Assignee: Bombardier Transportation GmbH, Berlin (DE)

( * ) Notice: Subject to any disclaimer, the term of this patent is extended or adjusted under 35 U.S.C. 154(b) by 0 days.

(21) Appl. No.: 16/860,225

(22) Filed: Apr. 28, 2020

(30) Foreign Application Priority Data

May 29, 2019 (CA) ...................... 3044650

(51) Int. Cl.
*B61F 19/04* (2006.01)
*B61G 11/00* (2006.01)
*B61F 19/08* (2006.01)
*B60R 19/20* (2006.01)
*B60R 21/36* (2011.01)
*B60R 21/00* (2006.01)

(52) U.S. Cl.
CPC ............ *B61F 19/04* (2013.01); *B60R 19/205* (2013.01); *B60R 21/36* (2013.01); *B61F 19/08* (2013.01); *B61G 11/00* (2013.01); *B60R 2021/009* (2013.01)

(58) Field of Classification Search
CPC .......... B61F 19/00; B61F 19/04; B61F 19/06; B61F 19/08; B60R 19/205; B60R 21/36; B60R 2021/009; B61G 11/00
See application file for complete search history.

(56) References Cited

U.S. PATENT DOCUMENTS

| | | | | |
|---|---|---|---|---|
| 6,031,449 A | * | 2/2000 | Laporte | G01S 13/86 340/436 |
| 6,443,510 B2 | | 9/2002 | Gibeau et al. | |
| 6,474,489 B2 | * | 11/2002 | Payne | B61F 19/06 105/392.5 |
| 6,619,491 B2 | * | 9/2003 | Payne | B61F 19/06 105/392.5 |
| 6,814,246 B2 | * | 11/2004 | Payne | B61F 19/06 105/392.5 |

(Continued)

FOREIGN PATENT DOCUMENTS

| | | | | |
|---|---|---|---|---|
| CN | 105564364 A | | 5/2016 | |
| DE | 102011114298 A1 | * | 3/2013 | ............. B60R 21/36 |

(Continued)

*Primary Examiner* — Zachary L Kuhfuss
(74) *Attorney, Agent, or Firm* — The Webb Law Firm

(57) ABSTRACT

A rail vehicle includes an airbag assembly having a housing, an airbag, a lid, at least one vessel and an aesthetic body panel. The airbag assembly is installed at an end of the rail vehicle. The airbag is placed inside the housing and the lid closes the housing. The lid is attached to the airbag so that it is located at a bottom portion of the airbag when the airbag is fully deployed. The lid and the aesthetic body panel, distant by a gap when the airbag is stored, are provided with compatible connecting interfaces so that the aesthetic body panel attaches to the lid through interconnection of the connecting interfaces upon inflation of the airbag with the pressurized fluid. The aesthetic body panel protect the inflated airbag from wear against the ground on which the rail vehicle travels.

9 Claims, 5 Drawing Sheets

(56) References Cited

U.S. PATENT DOCUMENTS

| | | | |
|---|---|---|---|
| 9,221,411 B2 * | 12/2015 | Rick | B60R 21/235 |
| 2003/0047370 A1 * | 3/2003 | Gibbs | B61F 19/04 |
| | | | 180/271 |
| 2014/0007790 A1 | 1/2014 | Somensi | |
| 2020/0198668 A1 * | 6/2020 | Fel | B61F 19/08 |
| 2020/0198669 A1 * | 6/2020 | Fel | B61F 19/08 |

FOREIGN PATENT DOCUMENTS

| | | | |
|---|---|---|---|
| DE | 102011114298 A1 | 3/2013 | |
| DE | 102013211273 A1 * | 12/2014 | B61F 19/06 |
| DE | 102017001332 A1 * | 7/2017 | B60R 21/36 |
| EP | 0887237 A1 | 12/1998 | |
| EP | 1142770 A1 | 10/2001 | |
| EP | 2995508 A1 | 3/2016 | |
| GB | 2342332 A * | 4/2000 | B60R 19/205 |
| JP | 2003341513 A * | 12/2003 | |
| KR | 100604398 B1 | 7/2006 | |
| KR | 1020070036319 A | 4/2007 | |
| KR | 1020070036320 A | 4/2007 | |
| WO | WO-2014140074 A1 * | 9/2014 | B61F 19/04 |

\* cited by examiner

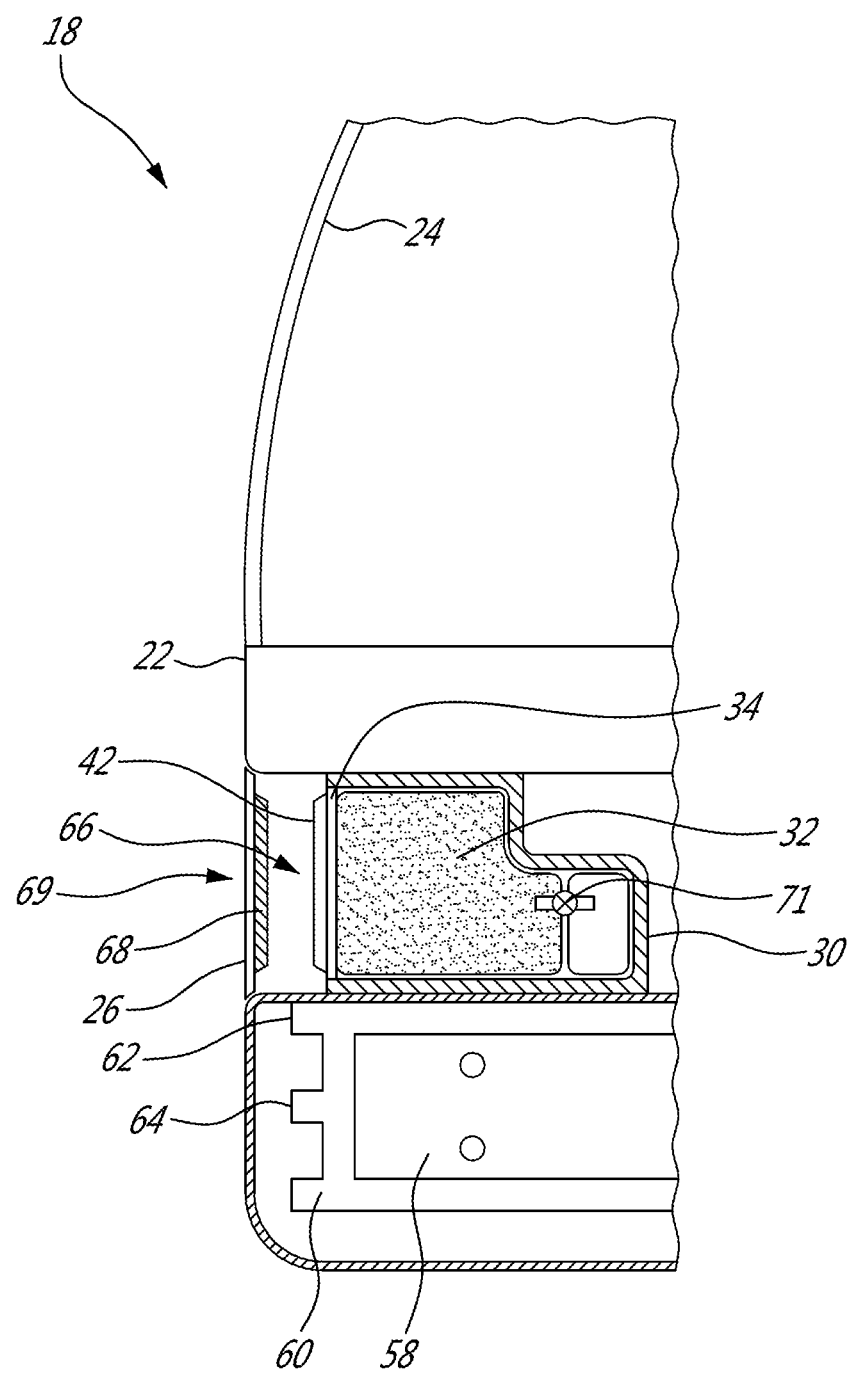

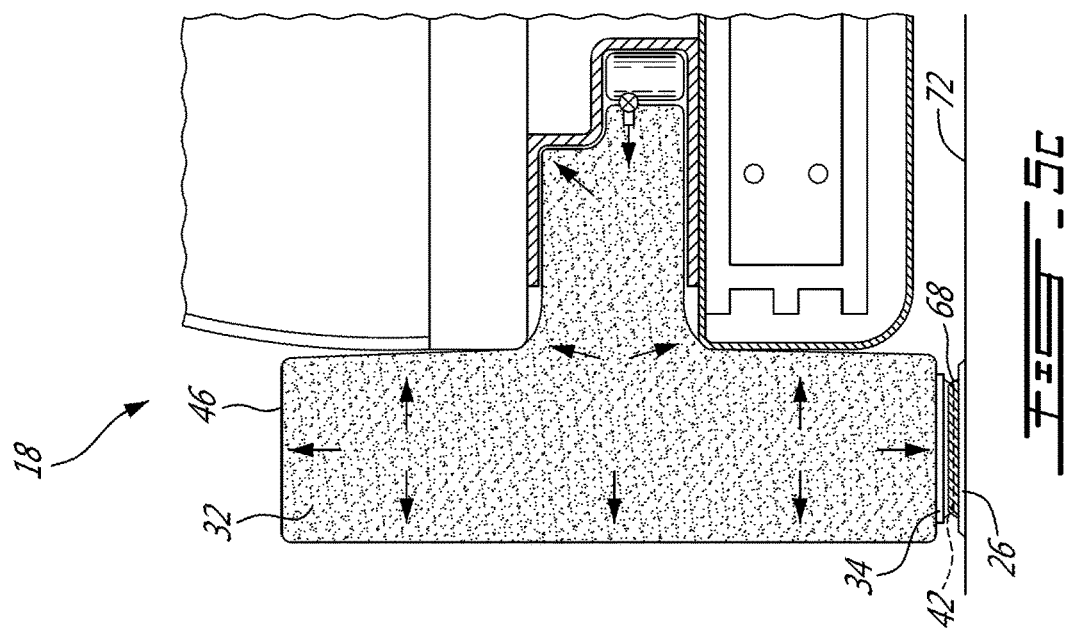
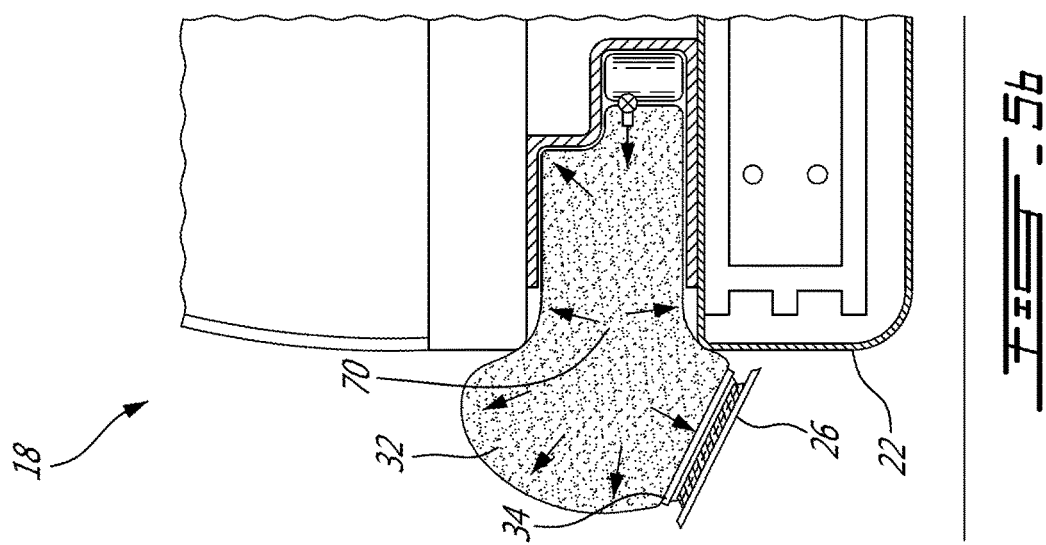
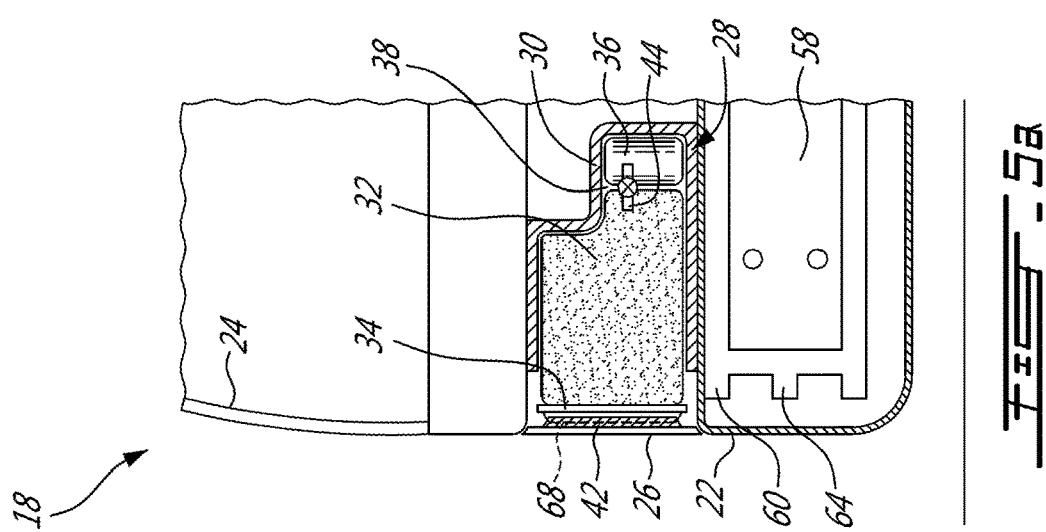

EXTERNAL AIRBAG ASSEMBLY FOR A RAIL VEHICLE

CROSS-REFERENCE TO RELATED APPLICATION

This application claims priority to Canadian Patent Application No. 3,044,650 filed May 29, 2019, the disclosure of which is hereby incorporated by reference in its entirety.

BACKGROUND OF THE INVENTION

Field of the Invention

The present invention generally relates to the field of rail vehicles. More specifically, the invention relates to a rail vehicle, especially a low-speed urban rail vehicle such as a tram, equipped with an external front airbag.

Description of the Related Art

Some rail vehicles, such as trams, circulate among car and pedestrians in an urban environment. In such a dense and constantly moving environment, unfortunate accidents still occur. Of those, accidents between rail vehicles and pedestrians are the main concern here.

Over the years, many solutions have been suggested to reduce the number of injuries and fatalities. For example, many concepts for inflatable pedestrian protection systems for railway vehicle have been proposed. However, hardly any of these concepts is presently used on production vehicles. Indeed, many proposed solutions show drawbacks or inconvenience that makes them less than ideal solutions. Here are a few examples.

United-States patent application publication no. US 2014/0007790 discloses a box installed on the vehicle's front end for stowing an inflatable bag. Although such a box may not disguise too much a locomotive, which often privileges function over design, it totally ruins the aesthetics of a tram, which adopts a more elaborated and pleasing aesthetic design that adds to the signature of a city.

European patent no. EP 2995508 discloses a safety system which comprises an upper airbag and a lower deploying flap, closing a lower gap between the rail vehicle and the ground because the airbag does not extend down to the ground. Although well integrated in the design of a tram, this system lacks protection in between the upper airbag and the lower flap, thereby not protecting a mid-portion of the body of a pedestrian against a direct impact with the rail vehicle.

Many protection airbags located in front of rail vehicles, such as the one disclosed in European patent no. EP 887237, present the particular feature of having a large volume. If the inflation of the airbag is to be sufficiently rapid to ensure full deployment before an impact occurs, a very large amount of gas needs to be injected under high pressure. This very large amount of gas needs to be stored in pressurized vessels, which takes much space inside a vehicle and negatively impact the ease with which such a protection system may be integrated in a light rail vehicle such as a tram.

Many other inflatable safety systems, such as the one disclosed in European patent no. EP 1142770, do not extend down to the ground, thereby not effectively closing the gap between the driver cabin underfloor and the ground, allowing a pedestrian getting trapped under the rail vehicle until it stops.

There is therefore a need for an improved pedestrian safety system for a rail vehicle.

SUMMARY OF THE INVENTION

It is an object of the present invention to provide an airbag for a rail vehicle and a rail vehicle equipped with such an airbag that overcomes or mitigates one or more disadvantages of known airbags for rail vehicles and rail vehicles equipped with such airbags, or at least provides a useful alternative.

Advantageously, the invention is capable of being integrated with the aesthetic design of a rail vehicle and allows extending the deployed airbag down to the ground without risking damages to the airbag.

In accordance with an embodiment of the present invention, there is provided a rail vehicle comprising a body, an aesthetic end cap, a removeable aesthetic body panel and an airbag assembly. The aesthetic end cap is located at an end of the body. The removeable aesthetic body panel has an aesthetic surface adapted to complement the aesthetic end cap. The aesthetic body panel has a first connecting interface on an inside surface opposed the aesthetic surface.

The airbag assembly is located behind and proximate the aesthetic body panel. The airbag assembly comprises a housing, an airbag, at least one vessel and a lid. The housing has an opening which defines a cavity therein where is placed the airbag. The at least one vessel contains a pressurized fluid and is fluidly connected to the airbag. The lid is adapted to removably close the opening. The lid is attached to the airbag so that it is located at a bottom portion of the airbag when the airbag is fully deployed. The lid has a second connecting interface on an external face of the lid opposed the cavity. The second connecting interface is compatible with the first connecting interface of the aesthetic body panel so as to be capable of attaching to it. Indeed, upon deployment of the airbag by the pressurized fluid, the lid engages the aesthetic body panel through the first and the second connecting interfaces interconnecting together. Once the airbag is fully inflated, the aesthetic body panel ends up being located underneath the airbag so as to prevent the airbag from wearing against a surface over which the rail vehicle travels.

Optionally, the airbag may comprise a plurality of tubes proximate a plurality of edges of the airbag once the airbag is inflated. Each one of the plurality of tubes is fluidly connected to at least one of the at least one vessel.

Alternatively, the airbag may comprise at least one tube proximate at least one edge of the airbag once inflated, the at least one tube being fluidly connected to at least one of the at least one vessel.

The airbag may further comprises at least one check valve located on an envelope of the airbag. The at least one check valve is operative to let ambient air flow inside the airbag when the pressurized fluid flows inside the at least one tube. The airbag may further comprise internal dividers defining internal cells, each one of the internal cells being fluidly connected to one of the at least one check valve.

The first connecting interface may be a first component of a hook-and-loop type of fastener while the second connecting interfaces may be a compatible second component of the hook-and-loop type of fastener.

Optionally, the aesthetic body panel may contain aramid fibre.

Optionally, the lid and the aesthetic body panel may be substantially distant by a gap when the airbag is stored in the housing.

The at least one vessel is located within the cavity.

In accordance with another embodiment of the present invention, there is provided an airbag assembly for a rail vehicle having an aesthetic end cap. The airbag assembly comprises a housing, an airbag, a lid and at least one vessel. The housing has an opening on one face defining a cavity therein. The airbag is placed inside the cavity. The lid is adapted to removably close the opening. The lid is attached to the airbag so that it is located at a bottom portion of the airbag when the airbag is fully deployed. The lid has a first connecting interface on its external face which is opposed the cavity. The at least one vessel contains a pressurized fluid and is fluidly connected to the airbag.

Optionally, the airbag may comprise at least one tube along at least one edge of the airbag once inflated. The at least one tube is fluidly connected to at least one of the at least one vessel.

Alternatively, the airbag may comprise a plurality of tubes along a plurality of edges of the airbag once inflated. Each one of the plurality of tubes is fluidly connected to at least one of the at least one vessel.

The airbag may further comprise at least one check valve located on an envelope of the airbag. The at least one check valve is adapted to let ambient air flow inside the airbag when the fluid flows inside the plurality of tubes.

The airbag may further comprise internal dividers defining internal cells where each one of the internal cells is fluidly connected to one of the at least one check valve.

Advantageously, the at least one vessel may be located within the cavity.

Optionally, the airbag assembly may include a removeable aesthetic body panel having an aesthetic surface adapted to complement the aesthetic end cap of the rail vehicle. The aesthetic body panel has a second connecting interface on an inside surface opposed its aesthetic surface. The aesthetic body panel has a larger width and height than those of the lid. Upon deployment of the airbag by the pressurized fluid filling the at least one tube, the lid is operative to engage the aesthetic body panel through the compatible first and second connecting interfaces. The aesthetic body panel is adapted to contact a surface over which the rail vehicle is adapted to run, thereby preventing the bottom portion of the airbag from wearing against the surface.

The housing is adapted to be placed behind the aesthetic body panel so as to create a gap between the lid and the aesthetic panel.

Advantageously, the aesthetic body panel contains aramid fiber.

Optionally, the first connecting interface may be a first component of a hook-and-loop type of fastener while the second connecting interface may be a compatible second component of the hook-and-loop type of fastener.

BRIEF DESCRIPTION OF DRAWINGS

These and other features of the present invention will become more apparent from the following description in which reference is made to the appended drawings wherein:

FIG. 4 is a cross-sectional side view of an end of the rail vehicle of FIG. 1 showing the installed airbag assembly;

FIG. 5a is a cross-sectional side view of an end of the rail vehicle of FIG. 1 in a first stage of deployment of the airbag of the installed airbag assembly;

FIG. 5b is a cross-sectional side view of an end of the rail vehicle of FIG. 1 in a second stage of deployment of the airbag of the installed airbag assembly;

FIG. 5c is a cross-sectional side view of an end of the rail vehicle of FIG. 1 in a last stage of deployment of the airbag of the installed airbag assembly.

DETAILED DESCRIPTION OF THE INVENTION

The present invention relates to an airbag for a rail vehicle, especially a light rail vehicle such as a tram, which may be well integrated behind the front fairing of the rail vehicle, may be rapidly deployed, may be easily and rapidly replaced and which covers the whole body height of a pedestrian. A body panel advantageously protects the airbag from wearing against the ground.

Figure 1:
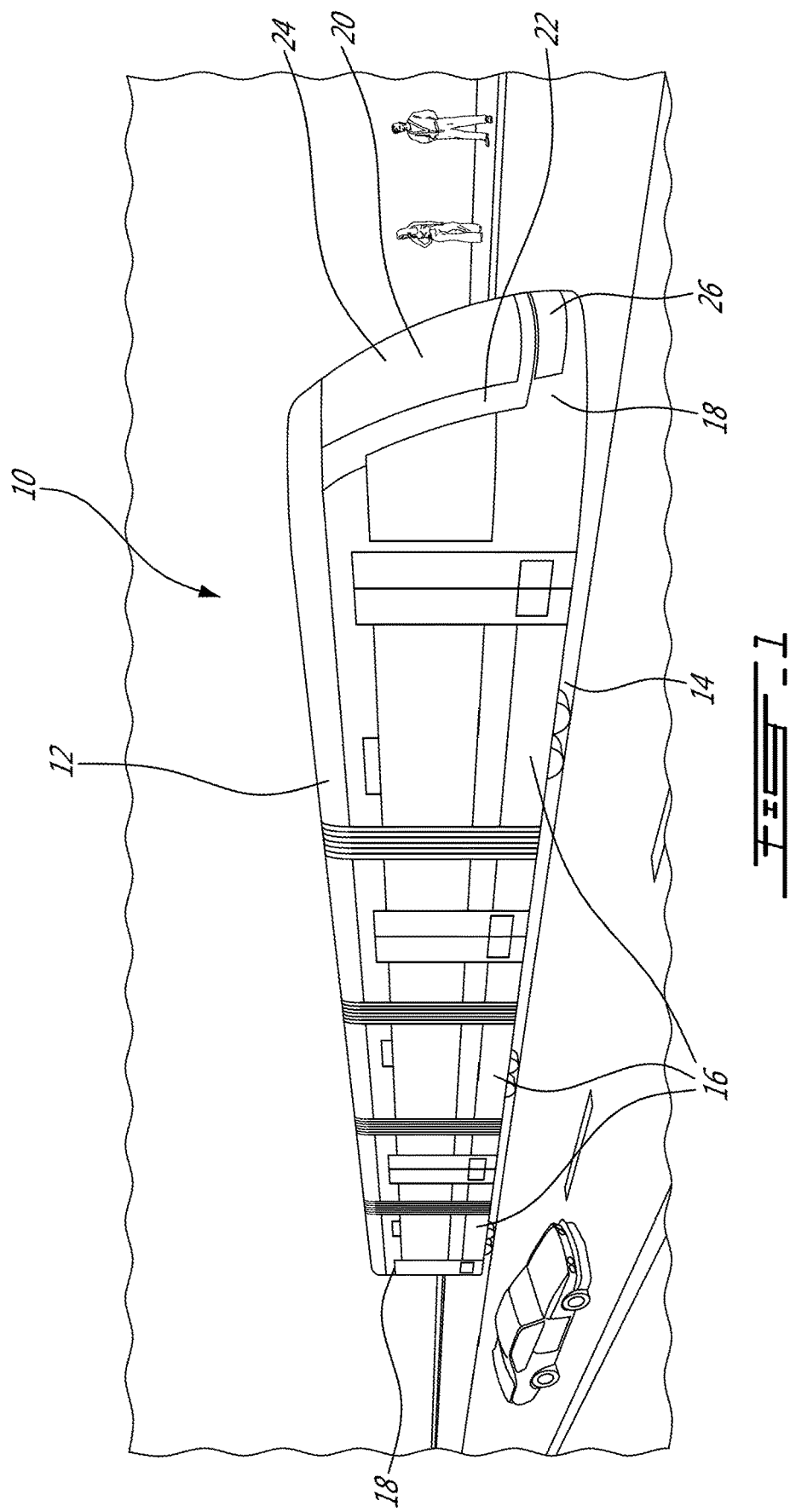
FIG. 1 is an isometric view of a rail vehicle in accordance with an embodiment of the present invention.

FIG. 1 is now referred to. A rail vehicle 10, such as a tram, is shown circulating on tracks in an urban environment amongst cars and pedestrians. The rail vehicle 10 has a railcar body 12 resting on bogies 14 (mostly hidden under side skirts 16). The rail vehicle has two ends 18, a front and a rear end, although, the vehicle being symmetrical and bi-directional, both ends 18 may be alternatively considered as a front and a rear end, depending on the direction of travel. Both ends 18 may be equipped with a driver cab 20.

Figure 2:
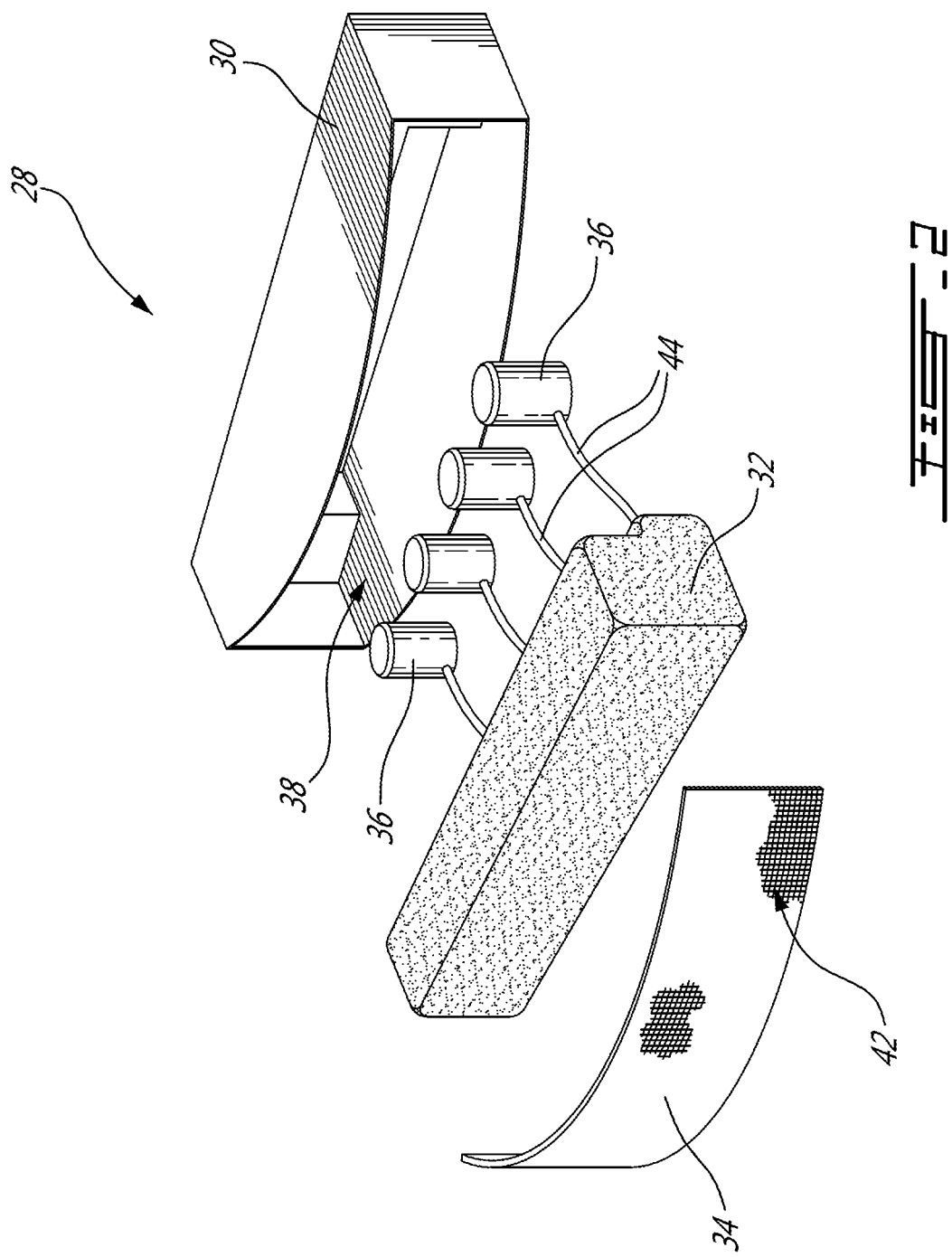
FIG. 2 is an exploded isometric view of an airbag assembly adapted to be installed in the rail vehicle of FIG. 1.

Typical with urban rail vehicles such as trams, both ends 18 are designed so as to show an aesthetically pleasing appearance to the vehicle 10. Each end 18 is provided with a streamlined fairing or end cap 22 and a windshield 24. Being part of the end cap 22, a removeable aesthetical body panel 26 is provided below the windshield 24. The aesthetic body panel 26 has an aesthetic exterior surface adapted to complement the end cap 22. An airbag assembly 28 is located behind this body panel 26, within an internal space of railcar body 12. This airbag assembly 28 is best shown in FIG. 2, now concurrently referred to.

The airbag assembly 28 comprises a housing 30, an airbag 32, a lid 34 and at least one vessel 36 containing a pressurized fluid and which is fluidly connected to the airbag 32. Optionally, the airbag assembly 28 may comprise the aesthetic body panel 26 as it may be required to replace it as well in case of airbag deployment, as shall be described hereinafter.

The housing 30, open on its front face, is designed to accommodate the airbag 32 in its cavity 38 where it is placed, properly folded or otherwise arranged for an eventual deployment. The lid 34 removably closes the opening of the cavity 38. The housing 30 and its lid 34 serve to protect the airbag 32 from the environment or from contaminants which could affect its proper operation. The housing 30 and its lid 34 are designed to be easily integrated behind the body panel 26, in a space at one end 18 of the rail vehicle 10. The airbag assembly 28 is designed to be easily replaceable as a single unit.

On its interior face, that is the face of the lid 34 facing the cavity 38 when the lid 34 is in place closing the housing 30, the lid 34 is attached to the airbag 32 so that upon complete airbag deployment, the lid 34 ends up at a predetermined location with respect to the airbag 32 and with respect to the rail vehicle 10. More specifically, the lid 34 is attached to the airbag 32 so that it is located at a bottom portion of the airbag 32 upon full deployment of the airbag 32. On its exterior face, that is the face of the lid facing the body panel 26 (or, from another perspective, the face of the lid 34 opposed the cavity 38 when the lid 34 is in place closing the housing 30), the lid 34 is provided with a first connecting interface 42. The first connecting interface 42 may be a first component of a hook-and-loop type of fastener (for example, Velcro™).

The one or more vessel 36 may be located either inside or outside the housing 30. If placed inside the housing 30, the one or more vessel 36 must be organized so as not to interfere with the airbag 32. For example, the one or more vessel 36 may be located within a separate compartment inside the cavity 38. If one vessel 36 is connected to the airbag 32, it may be either directly connected, that is through a single hose 44, or it may be connected to a manifold which distribute the pressurized fluid to different regions or chambers of the airbag through a plurality of hoses 44.

Figure 3:
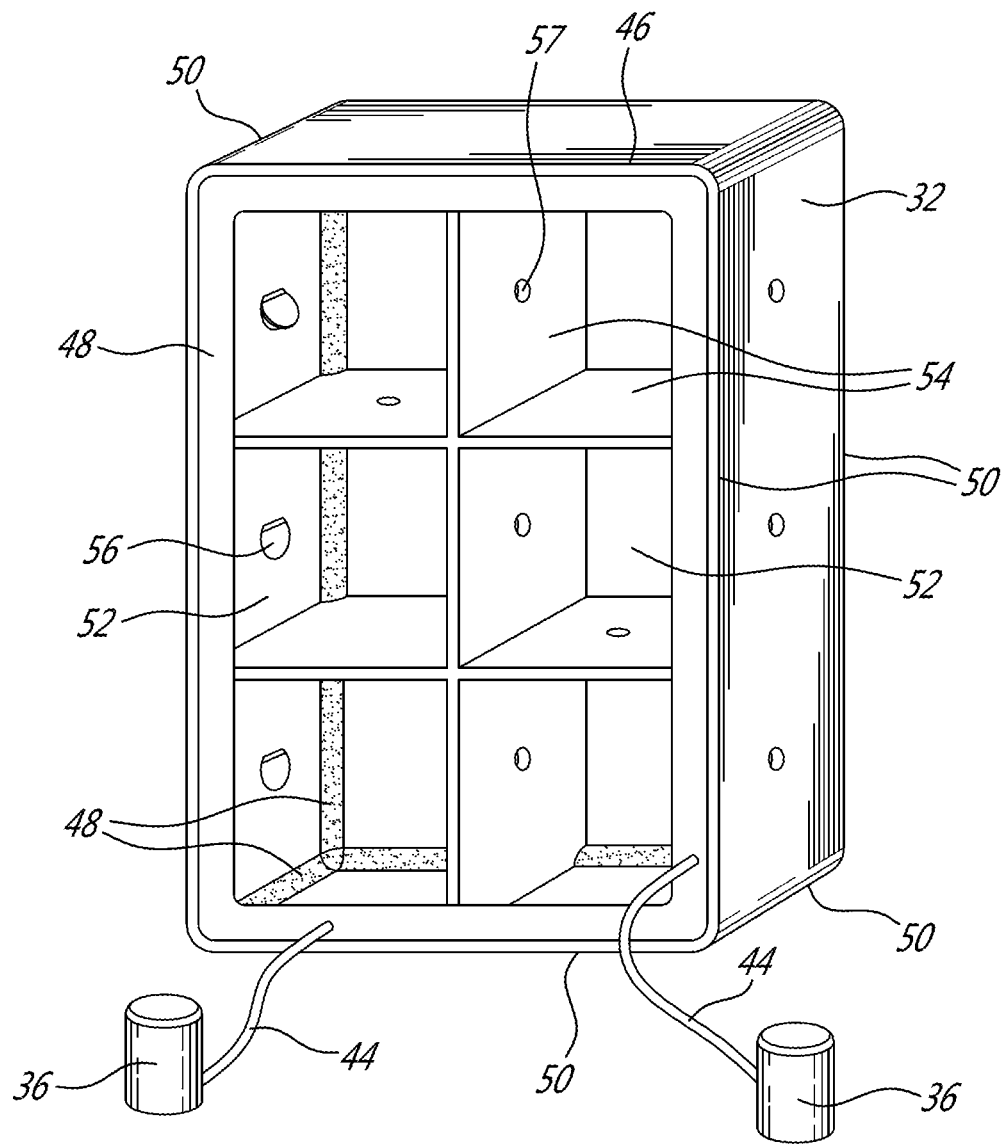
FIG. 3 is an isometric view of a deployed airbag with its envelope removed from its front surface in accordance with an embodiment of the present invention.

FIG. 3, now referred to, depicts details of the airbag 32. The airbag is made of an envelope 46, a plurality of inflatable tubes 48 running along a corresponding plurality of edges 50 generally defining a shape of the airbag 32 once inflated. Note that it is not absolutely necessary to use inflatable tubes 48 along all edges of the airbag 32, although it is certainly advisable to do so as it contributes both to the airbag 32 reaching its inflated shape more rapidly and retaining it once inflated. The inflatable tubes 48 may be organized and connected to the source of pressurized fluid in different ways. For example, all inflatable tubes 48 may be fluidly interconnected so that only one hose 44 is connected to the vessel 36. Alternatively, some inflatable tubes 48 may be interconnected together to create an interconnected sub-group, fluidly distinct from another sub-group of interconnected inflatable tubes 48. Each sub-group may be connected to one or many vessels 36 via separate hoses 44. Alternatively, each inflatable tube 48 may be separately connected to one or many vessels 36 via separate hoses 44. Also, for redundancy, one inflatable tube 48, or one sub-group of inflatable tubes 48, may be connected to two or more vessels 36 in case one vessel 36 would be defective and could not act as a source of pressurized fluid.

The airbag 32 may be divided in cells 52 using dividers or ribs 54. Those ribs 54 also provide some structure to the airbag 32 and help in defining its inflated shape. Note that it is also possible to provide inflatable ribs 54, which then act like an internal inflatable tube 48 and which contributes to the deployment of the airbag 32. Each cell 52 is filled using ambient air, which reaches the cell either directly if a check-valve 56 is installed directly on the envelope 46 of the airbag 32, or indirectly, that is through a hole 57 installed in a common rib 54 which connects to a second cell 52 having access to ambient air, likely through a check-valve installed on the envelope 46 defining the exterior surface of that second cell 52. The one or more check-valves 56 are adapted to let ambient air flow inside the airbag 32 when the pressurized fluid flows inside the at least one inflatable tube 48 and thereby deploys the airbag 32. The advantage of using inflatable tubes 48, along with the internal ribs 54, is that such inflatable tubes 48 provide the structure for the airbag 32 while requiring a much smaller volume of fluid than if the whole airbag was filled with pressurised fluid. This allows for a much more rapid deployment of the airbag 32, while keeping the volume of pressurized fluid contained in the vessels 36 sufficiently small that the whole airbag assembly 28 may fit within the structure of the front end 18 of the rail vehicle 10.

The one or more vessel 36 may simply be bottles suited to contain a pressurized fluid such as air or other suitable gas, fitted with a remotely operated valve to let the pressurized fluid flow to the inflatable tubes 48.

FIG. 4 is now concurrently referred to. As can be observed, the airbag assembly 28 is shown installed at one end 18 of the rail vehicle 10. More specifically, the airbag assembly 28 is typically installed above a chassis 58, in particular above the end sill 60 and recessed from a tip of its projecting portion 62 typically bearing the anti-climber device 64. Being slightly recessed from the tip of the end sill 60 prevents the airbag assembly 28 from being damaged by smaller or low energy impacts occurring at the end 18 of the rail vehicle 10. The airbag assembly 28 is also installed slightly recessed behind the aesthetic body panel 26 so that a gap 66 is created between the body panel 26 and the lid 34. Typically, tis gap 66 may be in the order of 1 to 3 cm (0.4 to 1.2 inches). Complementarily to the first connecting interface 42 installed on the exterior of the lid 34, the aesthetic body panel 26 is provided with a second connecting interface 68 on its inside surface opposed its exterior aesthetic surface 69, or in other words, facing the first connecting interface 42 so that they can interconnect together. The second connecting interface 68 is designed to be compatible and interconnect with the first connecting interface 42 so that the aesthetic body panel 26 may attach to the lid 34 through interconnection of the first and the second connecting interfaces 42, 68 upon inflation of the airbag 32 with the pressurized fluid, as will be further described hereinafter. For example, when the first connecting interface 42 is a first component of a hook-and-loop type of fastener, the second connecting interface 68 is a compatible second component of the hook-and-loop type of fastener.

The aesthetic body panel 26 is typically made slightly larger in height and width than the lid 34 so that the lid 34 may easily exit the streamlined end cap 22 through an aperture 70 (best shown in FIG. 5c) concealed by the body panel 26. The aesthetic body panel 26 may contain aramid fibre to protect the inflated airbag 32 against abrasion, as will be described hereinafter FIGS. 5a to 5c are now concurrently referred to. In FIG. 5a, upon detecting and identifying an imminent impact by sensors connected to a controller, a signal is sent by the controller to open valves 71 closing the vessels 36 so that the pressurized fluid contained therein starts inflating the inflatable tubes 48 of the airbag 32. Such sensors may be cameras, lidar, radar, etc, and are typically capable of scanning ahead of the rail vehicle 10 and of detecting an imminent impact 3 to 10 meters (9.8 to 32.8 feet) in front of the rail vehicle 10. Their use and integration in a vehicle for use with an airbag system such as the one described herein is well known in the art and will not be described further. As the inflatable tubes 48 start inflating, the lid 34 detaches from the housing 30 and engages the body panel 26 through the first and second connecting interfaces 42, 68 interlocking together. From this moment, the body panel 26 and the lid 34 move as one.

In FIG. 5b, the body panel 26 detaches from the streamlined end cap 22 of the vehicle's end 18 and is expelled outwardly with the lid 34 through the aperture 70. A portion of the airbag 26 is also expelled through the aperture 70. The airbag 32 starts morphing into its inflated shape under the force developed by inflating the inflatable tubes 48 at high pressure with the pressurized fluid. Ambient air starts filling the internal cells 52 by flowing through the check-valves 56.

The body panel 26 and the lid 34 start being oriented towards the ground under the inflation of the airbag 32.

In FIG. 5c, the airbag 32 is fully deployed right before the impending impact. The airbag 32 has taken its final undeformed shape (before impact) under the pressure developed by the pressurized fluid filling the inflatable tubes 48. The body panel 26 contacts the ground 72, thereby protecting the airbag 32 from wearing against abrasive pavement or other type of ground until the rail vehicle 10 comes to a stop. Note that, depending on geometry, the body panel 26 may contact the running rails first instead of pavement. Hence, in the present description, ground also means the running rails or any other surface over which the rail vehicle 10 travels. Advantageously, using aramid fibre reinforcement, the body panel 26 may be constructed adequately resistant to wear for protecting the airbag 32.

Advantageously, once the airbag 32 has deployed and performed its safety function of protecting a pedestrian, it is possible to easily replace the used airbag assembly 28 with another new and readily available airbag assembly 28. The whole used airbag assembly 28 may be taken out of the end 18 of the railway vehicle 10, for example through the aperture 70, and the new airbag assembly 28 may be installed similarly, through the aperture 70. A connection, through a standardized connector, is made to electrically connect the new airbag assembly 28 to the controller. The same body panel 26 may be detached from the lid 34 on the used airbag assembly 28 and repositioned in the aperture 70. However, it is likely that the used body panel 26 has been scratched in the process of protecting the used airbag 32, so it may be advisable to replace the used body panel 26 with a new one, which may be simply clipped into place in the aperture 70 and which may be provided with the new airbag assembly 28.

The present invention has been described with regard to preferred embodiments. The description as much as the drawings were intended to help the understanding of the invention, rather than to limit its scope. It will be apparent to one skilled in the art that various modifications may be made to the invention without departing from the scope of the invention as described herein, and such modifications are intended to be covered by the present description. The invention is defined by the claims that follow.

What is claimed is:

1. A rail vehicle comprising:
a body;
an aesthetic end cap located at an end of said body;
a removeable aesthetic body panel having an aesthetic surface adapted to complement said aesthetic end cap, said aesthetic body panel having a first connecting interface on an inside surface opposed said aesthetic surface;
an airbag assembly located behind and proximate said aesthetic body panel, the airbag assembly having:
a housing having an opening, said housing defining a cavity therein;
an airbag placed inside said cavity;
at least one vessel containing a pressurized fluid, said at least one vessel being fluidly connected to said airbag; and
a lid adapted to removably close said opening, said lid being attached to said airbag so that said lid is located at a bottom portion of said airbag when said airbag is fully deployed, said lid having a second connecting interface on an external face of said lid opposed said cavity, said second connecting interface being compatible with said first connecting interface so as to be capable of attaching to said first connecting interface,
wherein, upon deployment of said airbag by said pressurized fluid, said lid engages said aesthetic body panel through said first and said second connecting interfaces interconnecting together, said aesthetic body panel ending up being located underneath said airbag when said airbag is fully inflated so as to prevent said airbag from wearing against a surface over which the rail vehicle travels.

2. The rail vehicle of claim 1, wherein said airbag comprises a plurality of tubes proximate a plurality of edges of said airbag once inflated, each one of said plurality of tubes being fluidly connected to at least one of said at least one vessel.

3. The rail vehicle of claim 1, wherein said airbag comprises at least one tube proximate at least one edge of said airbag once inflated, said at least one tube being fluidly connected to at least one of said at least one vessel.

4. The rail vehicle of claim 3, wherein said airbag further comprises at least one check valve located on an envelope of said airbag, said at least one check valve being adapted to let ambient air flow inside said airbag when said pressurized fluid flows inside said at least one tube.

5. The rail vehicle of claim 4, wherein said airbag further comprises internal dividers defining internal cells, each one of said internal cells being fluidly connected to one of said at least one check valve.

6. The rail vehicle of claim 1, wherein said first connecting interface is a first component of a hook-and-loop type of fastener while said second connecting interfaces is a compatible second component of said hook-and-loop type of fastener.

7. The rail vehicle of claim 1, wherein said aesthetic body panel contains aramid fiber.

8. The rail vehicle of claim 1, wherein said at least one vessel is located within said cavity.

9. The rail vehicle of claim 1, wherein said lid and said aesthetic body panel is substantially distant by a gap when said airbag is stored in said housing.

* * * * *